United States Patent [19]
Kumar

[11] Patent Number: 6,133,700
[45] Date of Patent: Oct. 17, 2000

[54] TORQUE CONTROLLER SYSTEM HAVING A TORQUE PROCESSOR WITH IMPROVED TRACTIVE EFFORT DISTRIBUTION

[75] Inventor: Ajith Kuttannair Kumar, Erie, Pa.

[73] Assignee: General Electric Company, Erie, Pa.

[21] Appl. No.: 09/256,588

[22] Filed: Feb. 23, 1999

[51] Int. Cl.[7] ........................................ H02P 7/80
[52] U.S. Cl. .................. 318/85; 318/430; 318/52; 318/66; 318/71; 303/151; 180/197
[58] Field of Search ................ 318/430, 85, 52, 318/66, 71; 303/151; 180/197

[56] References Cited

U.S. PATENT DOCUMENTS

| | | |
|---|---|---|
| 4,945,753 | 8/1990 | Twombly . |
| 5,480,220 | 1/1996 | Kumar . |
| 5,610,819 | 3/1997 | Mann et al. . |
| 5,636,026 | 6/1997 | Mian et al. . |
| 5,767,637 | 6/1998 | Lansberry ............................ 318/146 |
| 5,841,254 | 11/1998 | Balch et al. . |
| 5,925,993 | 7/1999 | Lansberry ............................ 318/139 |

*Primary Examiner*—Karen Masih
*Attorney, Agent, or Firm*—Jill Breedlove; Carl Rowold

[57] ABSTRACT

A torque controller system provides improved torque distribution as a function of wheel diameter size in a vehicle propelled by electric traction motors. The system includes one or more torque processors each having a multiplier coupled to receive an input signal and configured to produce an output signal which is the product of the input signal and a variable multiplier value generated by a respective torque distribution generator based on a predetermined torque distribution control function.

10 Claims, 5 Drawing Sheets

TORQUE CONTROLLER SYSTEM HAVING A TORQUE PROCESSOR WITH IMPROVED TRACTIVE EFFORT DISTRIBUTION

BACKGROUND OF THE INVENTION

The present invention is related to torque control of a vehicle, such as a locomotive or a transit vehicle, propelled by traction motors, and, more particularly, to a torque controller system for providing improved torque distribution in that vehicle.

Locomotives and transit vehicles as well as other large traction vehicles are commonly powered by electric traction motors which are coupled to drive one or more axles of the vehicle. Locomotives and transit vehicles generally have at least four axle wheel sets per vehicle with each axle-wheel set being connected via suitable gearing to the shaft of an electric motor commonly referred as a traction motor. In a motoring mode of operation, the traction motors are supplied with electric current from a controllable source of electric power, such as an inverter. The traction motors apply torque to the axles which, in turn, apply torque to the wheels of the vehicle. The wheels exert tangential force or tractive effort on the surface on which the vehicle is traveling (e.g., the substantially parallel steel rails of a railroad track). Alternatively, in an electrical braking mode of operation, the motors operate as axle-driven electrical generators; that is, torque is applied to the motor shafts by their respectively coupled axle-wheel sets which then exert braking effort on the surface, thereby retarding or slowing the motion of the vehicle.

For efficient operation, either in the motoring or in the braking mode of operation, the vehicle is required to provide a substantial level of adhesion between its wheels and the surface on which the vehicle is traveling. In view of that requirement, the vehicle is generally required to achieve the maximum reachable adhesion on every axle-wheel set while, due to cost considerations, the respective power ratings of the controllable power source, the traction motor, wiring, and other equipment coupled to drive each axle-wheel should be as low as feasible for a given application. Due to various factors, such as wear and tear, or improper maintenance, the size of the diameter of the vehicle wheels may change relative to one another. Such wheel diameter differences can produce unequal vertical force or weight on each axle. The unequal vertical force could also be due to dimensional variations on the platform or the trucks where respective ones of the axle-wheel sets are mounted. If, for example, the vertical force on a given axle-wheel increases due to one or more of the above-listed factors, then the available tractive effort on that axle-wheel would increase and this situation would require a higher rated power equipment to make use of the increased tractive effort. It will be appreciated that when the vertical force increases on a given axle-wheel, there is a corresponding vertical force reduction to the other axle-wheels since the total vertical force in the vehicle remains constant. The reduced vertical force in turn produces a reduction in available tractive effort on the other axle-wheels and thus the rating of the power equipment coupled to drive these other axle-wheels would be less relative to the power equipment coupled to the axle-wheel with increased vertical force. Thus, it is desirable to operate each axle-wheel set such that each requires substantially the same power rating relative to one another, and it is desirable that each axle-wheel produce substantially the same level of tractive effort under worst case operating conditions, that is, when maximum tractive effort is truly required.

Presently available torque controllers are generally configured so that the torque supplied to each axle-wheel set under normal steady state operating conditions is substantially the same relative to one another, regardless of the vertical force any given axle-wheel set actually receives. This substantially even torque distribution would make tractive effort on a smaller diameter wheel greater than on a larger diameter wheel and would cause the smaller wheel to wear out faster. Thus, it would be advantageous to have a torque controller system which would allow for distributing the tractive effort such that it would be greater on axles with larger diameter wheels than on axles with smaller diameter wheels, at least under normal operation, that is, not during operational conditions which require worst-case tractive efforts. Any shift or distribution of tractive effort to the larger axle-wheel would make a corresponding reduction in tractive effort to the smaller axle-wheels; consequently, there would be a reduction of the wear rate of those axle-wheels compared to the wear rate of the larger wheel. Tractive effort distribution which takes into account the actual tractive effort requirements of each axle-wheel set in the vehicle would advantageously result in eventually all of the wheels having a substantially similar diameter with respect to one another since during most operations the locomotive will be running at high speeds.

BRIEF SUMMARY OF THE INVENTION

A torque controller system provides improved torque distribution in a vehicle propelled by electric traction motors. The torque controller system includes a subtractor for receiving a total torque command signal as a minuend input signal and for receiving a total torque feedback signal as a subtrahend input signal. The subtractor is configured to produce a total torque difference output signal. A torque regulator is coupled to receive the total torque difference output signal to generate a total torque regulated output signal. A divider is coupled to receive the total torque regulated signal and configured to divide the regulated signal into a plurality of split torque command output signals corresponding to the number of respective loads, (e.g., axle-wheel sets) individually controlled by the torque controller. Each of a plurality of multipliers is coupled to receive a respective one of the split torque command output signals and is configured to produce a respective split torque command product output signal. Each of the multipliers has a torque distribution generator coupled thereto for generating a variable multiplier value based on a predetermined torque distribution control function. Each of a plurality of subtractors is coupled to receive a respective one of the split torque product output signals as a minuend input signal and for receiving a split torque feedback signal corresponding to a respective one of the loads being controlled by the torque controller. Each of the subtractors is configured to produce a split torque difference output signal. Each of a plurality of regulators is coupled to receive a respective one of the split torque difference signals and to generate a split torque regulated signal; and a summer is configured for receiving the split torque feedback signals from each of the loads to generate the total torque feedback signal. Each combination of a respective one of the multipliers and a respective one of the torque distribution generators comprises a torque processor which conveniently provides individual processing to a respective one of the split torque command signals based on wheel diameter variation in the wheels of the vehicle.

BRIEF DESCRIPTION OF THE DRAWINGS

For a better understanding of the present invention, reference may be had to the following detailed description taken in conjunction with the accompanying drawings in which.

DETAILED DESCRIPTION OF THE INVENTION

Figure 1:
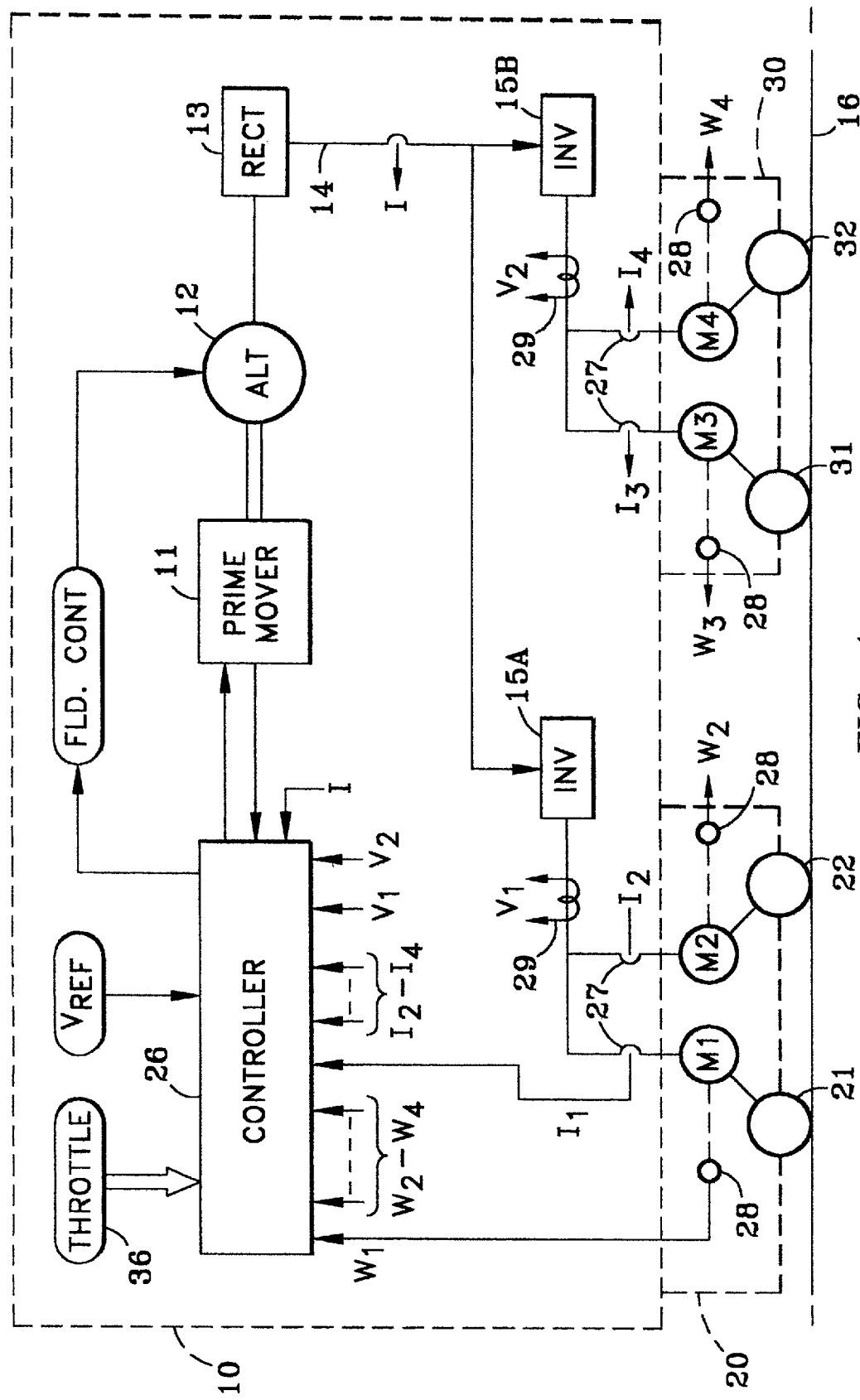
FIG. 1 shows a simplified block diagram of an exemplary propulsion system which could benefit by using a torque controller system accordance with the present invention.

A torque controller system according to preferred embodiments of the present invention may be utilized in various types of alternating current (AC) induction motor powered vehicles such as, for example, transit cars and locomotives. For purpose of illustration, the invention is described herein as it may be applied to a locomotive. For example, a propulsion system 10 of FIG. 1 includes a variable speed prime mover 11 mechanically coupled to a rotor of a dynamo electric machine 12 comprising a 3-phase alternating current (AC) synchronous generator or alternator. The 3-phase voltages developed by alternator 12 are applied to AC input terminals of a conventional power rectifier bridge 13. The direct current (DC) output of bridge 13 is coupled via DC link 14 to a pair of controlled inverters 15A and 15B which invert the DC power to AC power at a selectable variable frequency. The AC power is electrically coupled in energizing relationship to each of a plurality of adjustable speed AC traction motors M1 through M4. Prime mover 11, alternator 12, rectifier bridge 13 and inverters 15A, 15B are mounted on a platform of the traction vehicle 10, such as a four-axle diesel-electric locomotive. The platform is in turn supported on two trucks 20 and 30, the first truck 20 having two axle-wheel sets 21 and 22 and the second truck 30 having two axle-wheel sets 31 and 32.

Each of the traction motors M1–M4 is hung on a separate axle and its rotor is mechanically coupled, via conventional gearing, in driving relationship to the associated axle-wheel set. In the illustrative embodiment, the two motors M1 and M2 are electrically coupled in parallel with one another and receive power from inverter 15A while motors M3 and M4 are coupled to inverter 15B. However, in some instances, it may be desirable to provide an inverter for each motor or to couple additional motors to a single inverter. Suitable current transducers 27 and voltage transducers 29 are used to provide a family of current and voltage feedback signals respectively representative of the magnitudes of current and voltage in the motor stators. Speed sensors 28 are used to provide speed signals representative of the rotational speeds W1–W4 in revolutions per minute (RPM) of the motor shafts. These speed signals are readily converted to wheel speed in a well known manner. For simplicity, only single lines have been indicated for power flow although it will be apparent that the motors M1–M4 are typically three phase motors so that each power line represents three lines in such applications.

The magnitude of output voltage and current supplied to rectifier bridge 13 is determined by the magnitude of excitation current supplied to the field windings of the alternator 12. The excitation current is set in response to an operator demand (throttle 36) for vehicle speed by the controller 26 which is in turn responsive to actual speed as represented by signals W1–W4. The controller 26 converts the speed command to a corresponding torque command for use in controlling the motors M1–M4. Since AC motor torque is proportional to rotor current and air gap flux, these quantities may be monitored; or, alternatively, other quantities such as applied voltage, stator current and motor RPM may be used to reconstruct motor torque in controller 26. A more detailed analysis of such techniques is given in U.S. Pat. No. 4,243,927 and in a paper published in *IEEE Transactions on Industry Applications*, Vol. IA-13, No. 1, January 1977, entitled "Inverter-Induction Motor Drive For Transit Cars," by Plunkett and Plette.

Figure 2:
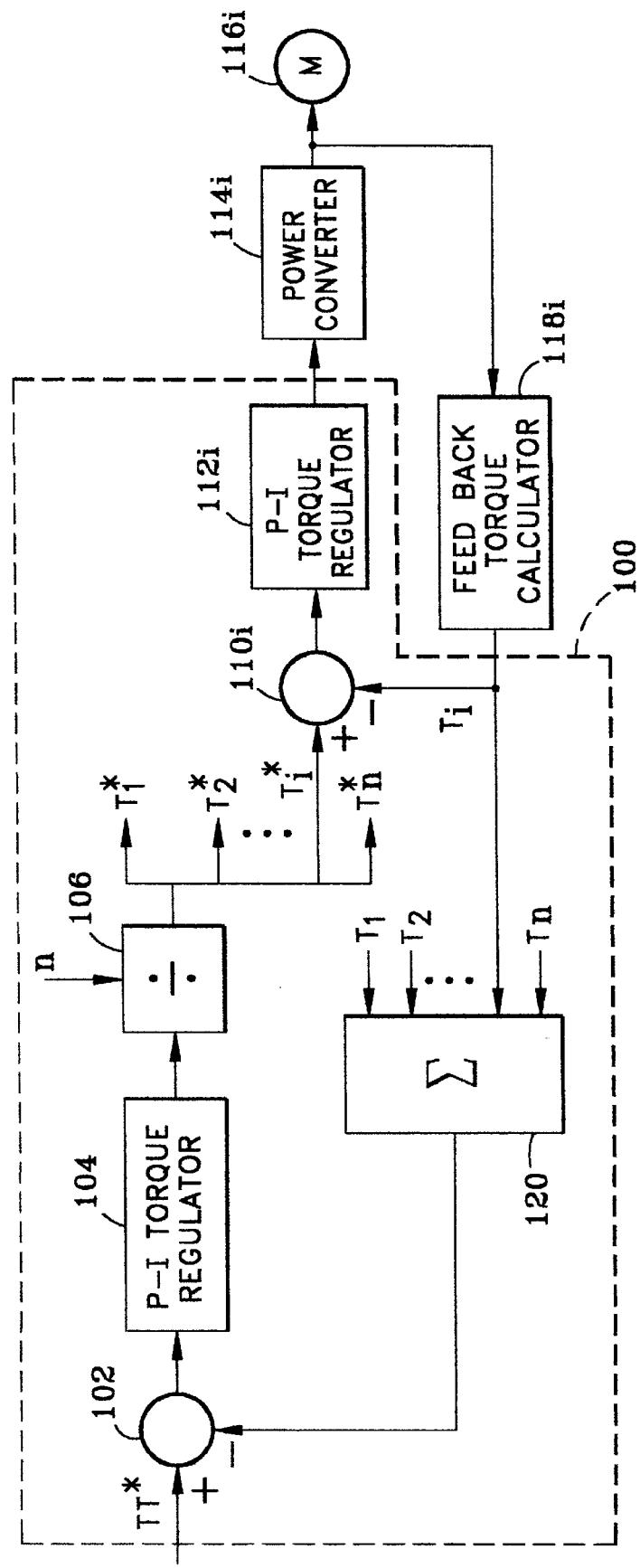
FIG. 2 shows a block diagram of a prior art torque controller system.

FIG. 2 shows an exemplary prior art torque controller system 100 configured to command substantially the same level of torque to each of the vehicle axle-wheel sets, independently of the vertical force which is actually received by any of such axle-wheels. As shown in FIG. 2, a full torque command signal (TT*) such as may be generated in controller 26 (FIG. 1), is received by a subtractor 102 as a minuend input signal, and a total torque feedback signal is received by subtractor 102 as a subtrahend input signal so that subtractor 102 generates a total torque difference output signal. A torque regulator 104, using conventional control techniques well-known to those skilled in the art, such as proportional plus integral (P-I) control techniques, is coupled to receive the total torque difference signal to produce a total torque regulated output signal. A signal divider 106 splits or divides the total torque regulated signal into a plurality of n split torque command output signals which correspond to the number of loads, i.e., axle-wheel sets, which are individually controlled by the torque controller. It will be appreciated by those skilled in the art, that each respective load may include either a single axle-wheel set or multiple axle-wheel sets, such as the multiple axle-wheel sets which may be mounted in a single truck. For example, if the total torque regulated signal corresponds to a torque value of 12,000 ft-lb and the number of axle-wheel sets is six, then each split torque command signal would have a torque value which corresponds to about 2,000 ft-lb. It will be further appreciated that if one of the axle-wheel sets is disabled due to any reason, e.g., thermal overload, regulator 104 would continue to keep the overall tractive effort substantially constant.

For the sake of simplicity of illustration and explanation, FIG. 2 shows only the circuitry associated with the ith split torque command signal wherein i is any positive integer from 1 to n. It will be appreciated, however, that in general there will be a plurality n of the circuits having reference numerals with the i subscript. A subtractor $110_i$ is coupled to receive a respective one of the split torque command signals (e.g., $T_i^*$) as a minuend input signal, and a split torque feedback signal ($T_i$) as a subtrahend input signal. As explained above, the torque feedback signal may be computed using well-known techniques using applied voltage, motor RPM, and rotor current in a feedback torque calculator $118_i$. The split torque difference signal from subtractor $110_i$ is received by a torque regulator $112_i$ which, as discussed above, may use well-known P-I control techniques so as to produce a regulated split torque signal. A power converter $114_i$, such as either of inverters 15A or 15B (FIG. 1), receives the regulated split torque signal to generate a suitable set of power signals for driving a motor $116_i$ for driving the ith axle-wheel set (not shown). A summer 120 is coupled to receive each split torque feedback signal so to generate the total torque feedback signal which is applied to subtractor 102. It will be appreciated that, controller 100 does not have the capability to distribute the split torque command signals in a manner that compensates for axle-wheel sets having different tractive efforts needs relative to one another such as may be the case if one or more of the wheels in a given axle has a diameter which deviates from the average diameter of the vehicle's wheels.

Figure 3:
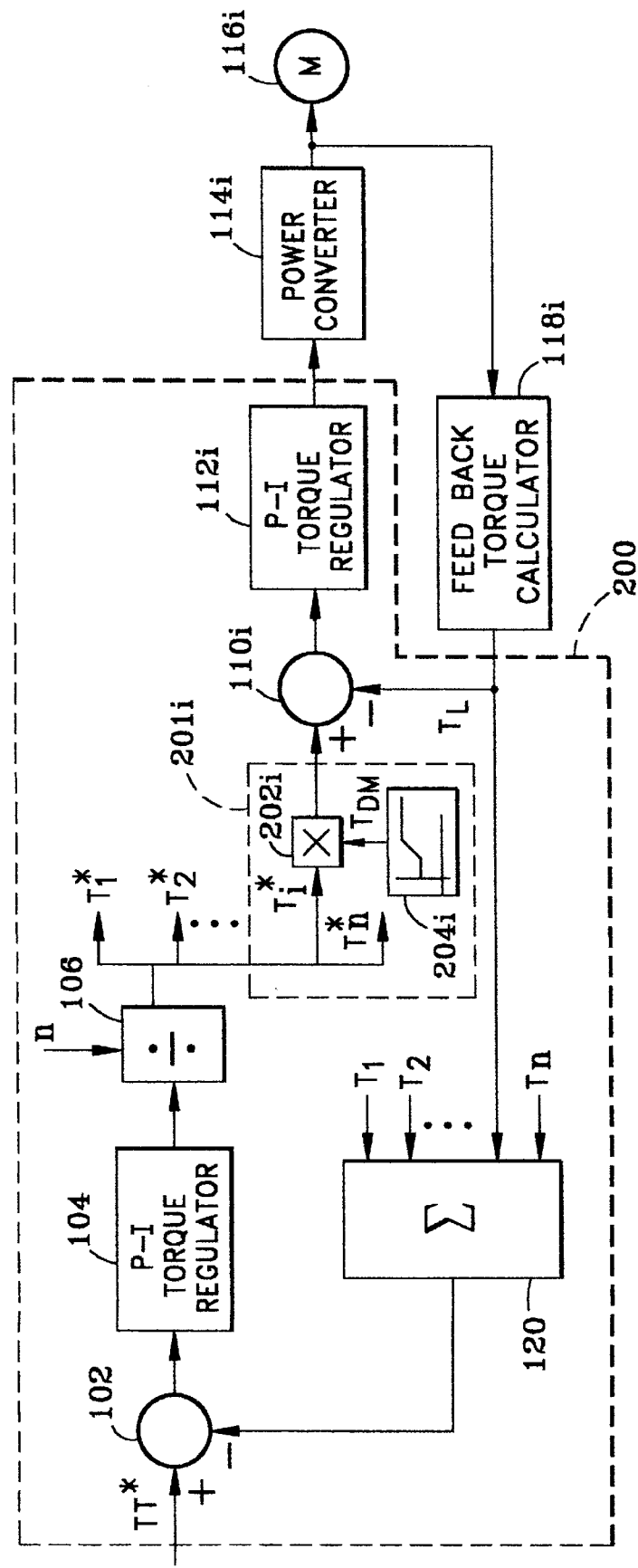
FIG. 3 shows a block diagram of a torque controller system in accordance with preferred embodiments of the present invention.
Figure 4:
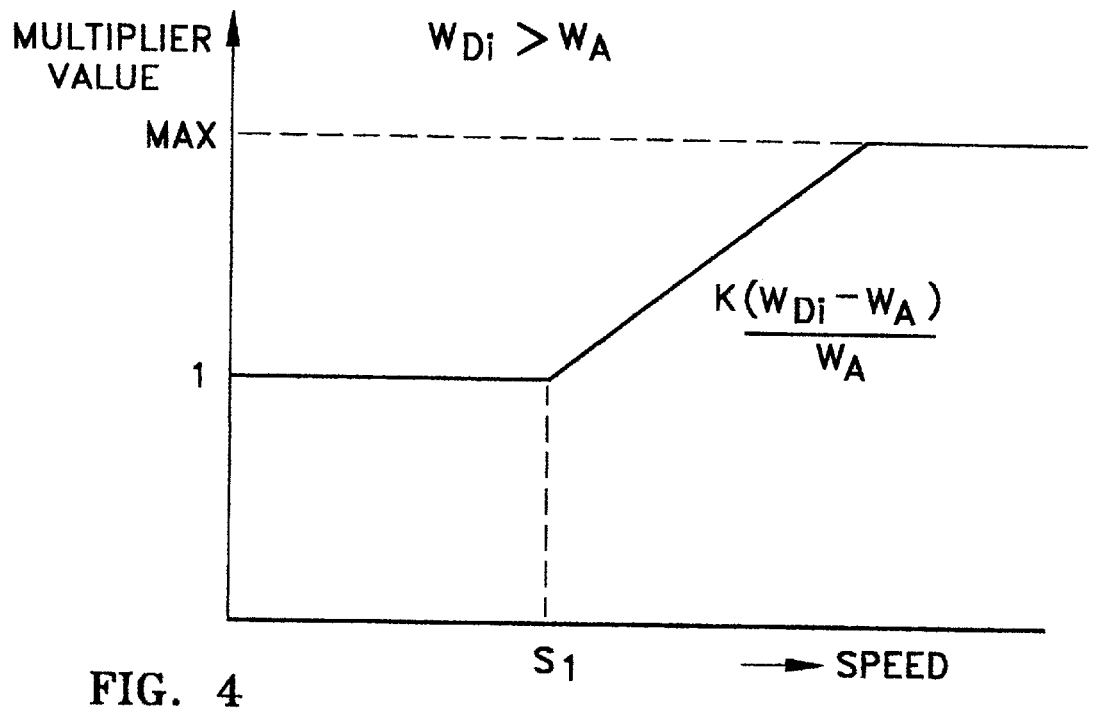
FIGS. 4 and 5 graphically illustrate an exemplary torque distribution control function which may be employed by the torque controller system shown in FIG. 3.
Figure 5:
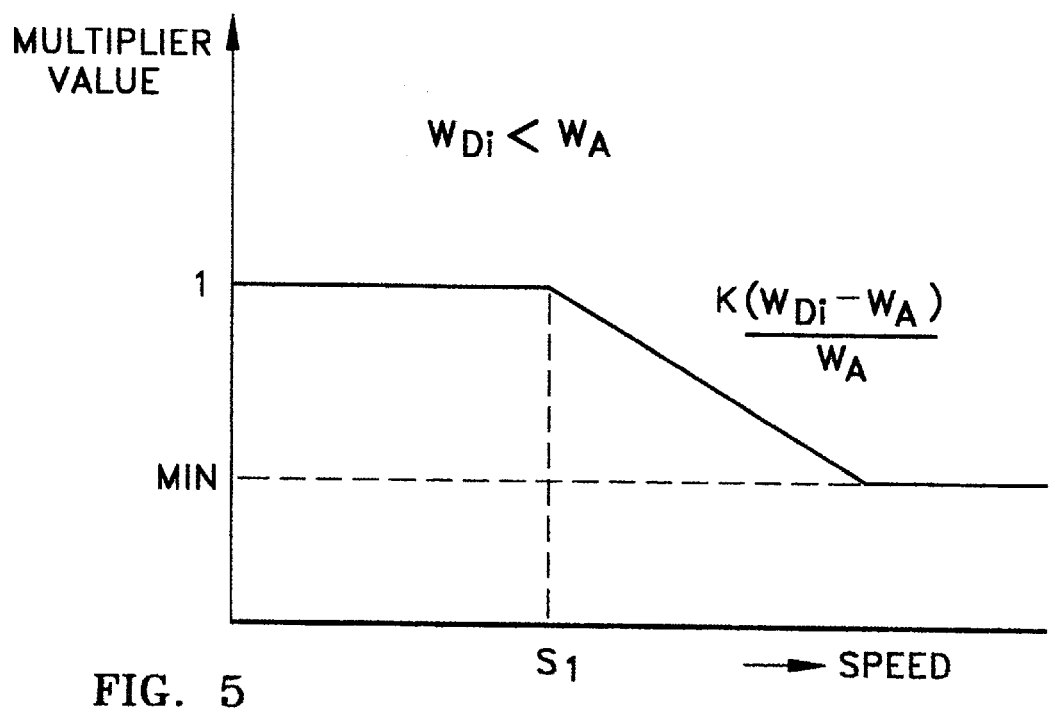

FIG. 3 shows a block diagram of a torque controller system 200 configured in accordance with preferred embodiments of the present invention that allows for improved torque distribution in the vehicle which is advantageously implemented relatively easily in existing torque controllers. Although the block diagram of FIG. 3 shows hardware components, it will be further appreciated that the invention is preferably implemented in a computer, such as the microprocessor-based controller 26 of FIG. 1. For the sake of simplicity, circuitry which may be used in either of torque controllers 100 or 200 is identified with the same reference numeral and the operational description of such circuits will not be repeated. A plurality of processors such as processor 201$_i$ made up of a multiplier 202$_i$ and a torque distribution generator 204$_i$ allows for individually processing the split torque command signals based on wheel diameter size. As shown in FIG. 3, prior to subtractor 110$_i$, the multiplier 202$_i$ is coupled to receive a respective one of the split torque command signals (e.g., $T_i^*$) to produce a respective split torque command product output signal. The multiplier 202$_i$ is coupled to the torque distribution generator 204$_i$ which generates a respective variable multiplier value based on a predetermined torque distribution function which compensates for wheel diameter size variation. By way of comparison, in controller 100, although no multiplier is explicitly shown, it will be appreciated that in essence each split torque command signal is equally weighed as if it were multiplied by a unity factor. On the other hand, as best seen in FIGS. 4 and 5, in controller 200, each respective split torque command signal (e.g., $T_i^*$) can be multiplied by a respective multiplier value which varies as a function of wheel diameter size. This would allow for matching, based on wheel diameter variation, the actual tractive effort needs of the axle-wheel set coupled to motor 116$_i$, for example. Patent application Ser. No. 09/118,875 (docket 20-LC-1901), titled "Wheel Diameter Calibration System For Vehicle Slip/Slide Control", filed on Jul. 20, 1998 and commonly assigned to the same assignee of the present invention, describes a technique and apparatus which may be conveniently used to measure wheel diameter size while the locomotive is in motion. However, it should be understood that any other technique which allows for measuring wheel diameter size in operation could be readily employed in the implementation of the present invention.

FIGS. 4 and 5 show one exemplary torque distribution function which may be used by a respective torque distribution function generator, such as generator 204$_i$, to generate the variable multiplier value used by the multiplier coupled to generator 204$_i$, in this case multiplier 202$_i$. More specifically, FIG. 4 shows a torque distribution function which may be used in the case where the wheel diameter size ($Wi_d$) of the ith wheel is larger than the average wheel diameter size in the vehicle. For vehicle speeds equal to or below a predetermined vehicle speed (S1), the value of the multiplier factor may have a value substantially equal to unity, i.e., one. For vehicle speeds above the S1 speed, the multiplier value may vary as a function of vehicle speed up to a maximum multiplier value. The multiplier value variation up to that maximum value may be substantially linear. Once the maximum value is reached, regardless of increased vehicle speed, the multiplier value would remain substantially constant. In this case, the rate of change of the multiplier value or slope in the linear range of operation can be computed from the following equation:

$$m = \frac{K(W_{Di} - W_A)}{W_A},$$

$$\text{where } W_A = \sum_{i=1}^{n} \frac{W_{Di}}{n} \text{ and}$$

wherein m is the slope in the linear range of operation, K is a suitable scale factor, $W_{Di}$ is the ith wheel diameter and WA is the average wheel diameter size in the vehicle.

FIG. 5 shows the torque distribution function which may be used in the case where the wheel diameter ($W_{Di}$) of the ith wheel is smaller than the average wheel diameter size in the vehicle. As before, for vehicle speeds up to or below the predetermined wheel speed (S1), the multiplier may have a value of one. However, for vehicle speeds above the S1 vehicle speed, the multiplier may vary as a function of vehicle speed down to a minimum multiplier value. The multiplier value variation down to its minimum value may be substantially linear. Once the minimum value is reached, regardless of increased vehicle speed, the multiplier value would remain substantially constant at the minimum multiplier value.

Figure 6:
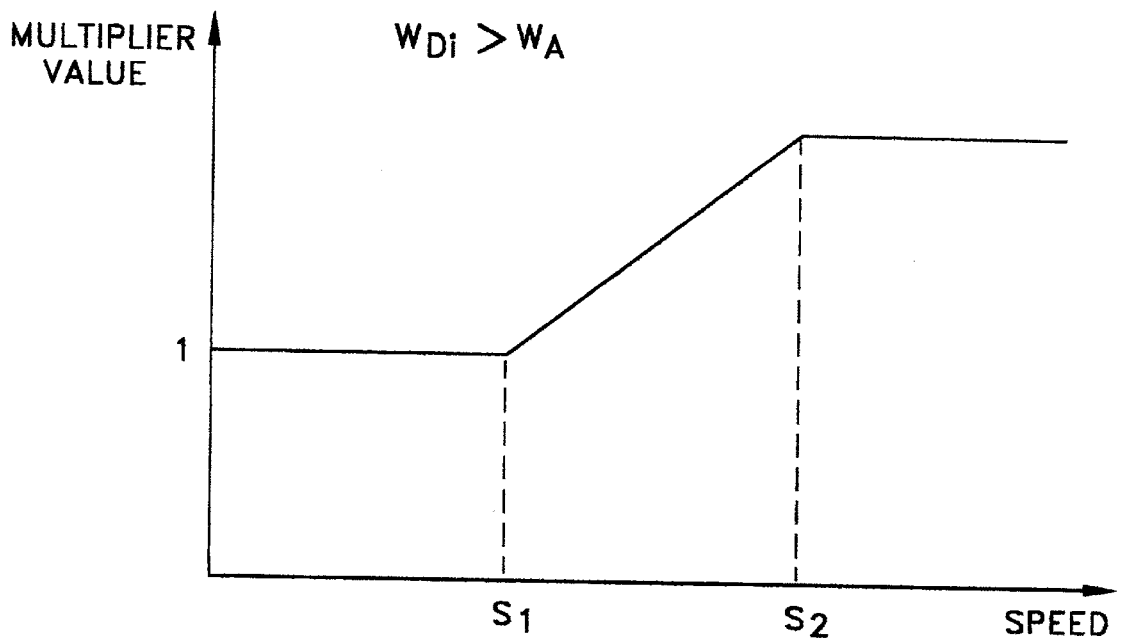
FIGS. 6 and 7 graphically illustrate another exemplary torque distribution control function which may be employed by the torque controller system shown in FIG. 3.
Figure 7:
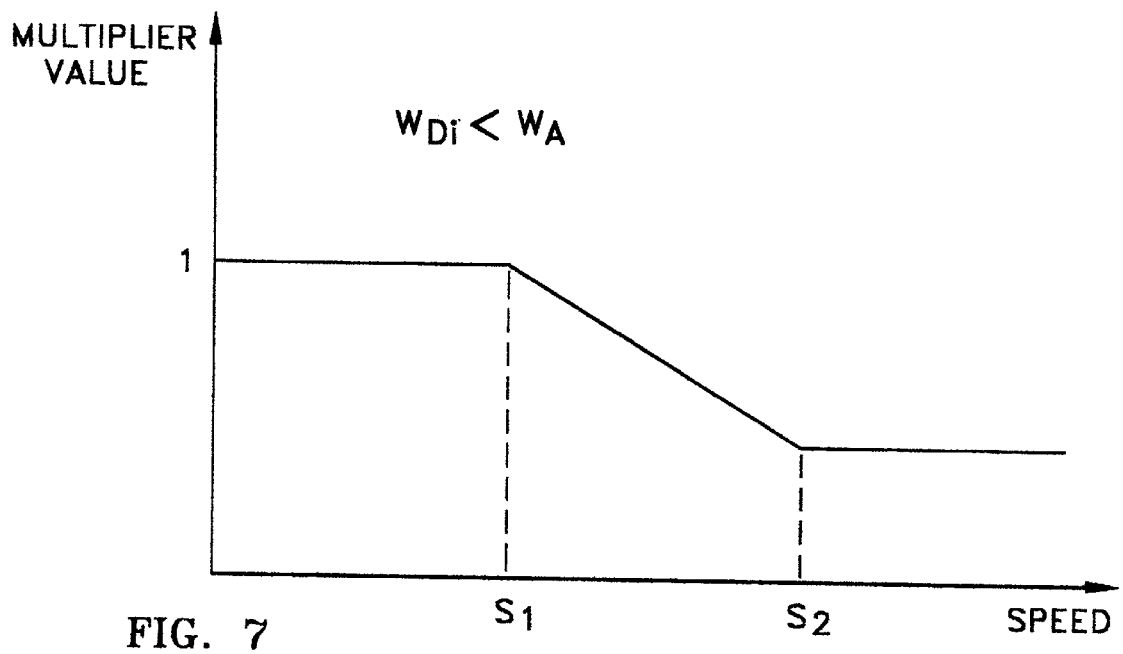

FIGS. 6 and 7 illustrate another example of the torque distribution function which may be used by the torque distribution function generator. As shown in FIG. 6, when the ith wheel has diameter size which is larger than the average wheel diameter size, then from a first predetermined vehicle speed (S1) to a second predetermined vehicle speed (S2), the multiplier value can be chosen to vary substantially linearly so that the value increases with increasing vehicle speed up to the second vehicle speed value. For vehicle speeds above the second vehicle speed, the multiplier value remains substantially constant at a value which is higher than unity. For vehicle speeds below the first speed value, the multiplier value is substantially equal to one. As shown in FIG. 7, when the ith wheel has a diameter size which is smaller than the average wheel diameter size, then from the first predetermined vehicle speed to the second vehicle speed, the multiplier value can be chosen to vary substantially linearly so that the value decreases with increasing vehicle speed up to the second vehicle speed value. For vehicle speeds beyond the second vehicle speed, the multiplier value remains substantially constant at a value which is below one. Once again, for vehicle speeds below the first speed value, the multiplier value is substantially equal to one.

It will be understood that the specific embodiments of the invention shown and described herein are exemplary only. Numerous variations, changes, substitutions and equivalents will occur to those skilled in the art without departing from the spirit and scope of the present invention. Accordingly, it is intended that all subject matter described herein and shown in the accompanying drawings be regarded as illustrative only and not in a limiting sense and that the scope of the invention be solely determined by the appended claims.

What is claimed is:

1. A torque controller system for controlling torque distribution in a vehicle propelled by electric traction motors, said system comprising:

a subtractor for receiving a total torque command signal as a minuend input signal and for receiving a total torque feedback signal as a subtrahend input signal, said subtractor configured to produce a total torque difference output signal;

a torque regulator coupled to receive the total torque difference output signal to generate a total torque regulated output signal;

a divider coupled to receive the total torque regulated signal and configured to divide the regulated signal into a plurality of split torque command output signals corresponding to the number of loads respectively individually controlled by the torque controller;

a plurality of multipliers each coupled to receive a respective one of the split torque command output signals and configured to produce a respective split torque command product output signal, each of said multipliers having a respective torque distribution generator coupled thereto for generating a variable multiplier value based on a predetermined torque distribution control function;

a plurality of subtractors each coupled to receive a respective one of the split torque product output signals as a minuend input signal and a for receiving a split torque feedback signal corresponding to a respective one of the loads being controlled by the torque controller, each of said subtractors being configured to produce a respective split torque difference output signal;

a plurality of regulators each coupled to receive a respective one of the split torque difference signals to generate a respective split torque regulated signal; and a summer for receiving the split torque feedback signals from each of the loads to generate the total torque feedback signal.

2. The system of claim 1 wherein the torque distribution control function has a substantially unity value from about zero vehicle speed up to about a predetermined first vehicle speed.

3. The system of claim 2 wherein the predetermined torque control distribution function has a value which changes from the unity value up to a maximum value at a predetermined rate whenever at least one wheel coupled to one of the loads has a respective wheel diameter which exceeds a calculated average wheel diameter size, the value of the torque distribution control function remaining substantially at the maximum value for vehicle speeds above or equal to a predetermined second vehicle speed.

4. The system of claim 3 wherein the predetermined torque control distribution function has a value which changes from the unity value down to a minimum value at a predetermined rate whenever at least one wheel coupled to one of the loads has a respective wheel diameter which is below the calculated average wheel diameter size, the value of the torque distribution control function remaining substantially at the minimum value for vehicle speeds above or equal to a predetermined second vehicle speed.

5. The system of claim 4 wherein the torque distribution control function varies substantially linearly from the first to the second vehicle speed.

6. A torque processor for providing improved torque distribution in a vehicle having wheels propelled by electric traction motors, said processor comprising:

a torque distribution generator for generating a multiplier value which varies based on a predetermined torque distribution control function which compensates for wheel diameter variation in the wheels of the vehicle; and a multiplier coupled to the torque distribution generator to receive the multiplier value and a respective input signal representative of a split torque command output signal, the multiplier being configured to produce an output signal which is the product of the input signal and the multiplier value.

7. The processor of claim 6 wherein the torque distribution control function has a substantially unity value from about zero vehicle speed up to about a predetermined first vehicle speed.

8. The processor of claim 7 wherein the predetermined torque control distribution function has a value which changes from the unity value up to a maximum value at a predetermined rate whenever at least one wheel coupled to one of the loads has a respective wheel diameter which exceeds a calculated average wheel diameter size, the value of the torque distribution control function remaining substantially at the maximum value for vehicle speeds above or equal a predetermined second vehicle speed.

9. The processor of claim 8 wherein the predetermined torque control distribution function has a value which changes from the unity value down to a minimum value at a predetermined rate whenever at least one wheel coupled to one of the loads has a respective wheel diameter which is below the calculated average wheel diameter size, the value of the torque distribution control function remaining substantially at the minimum value for vehicle speeds above or equal a predetermined second vehicle speed.

10. The processor of claim 9 wherein the torque distribution control function varies substantially linearly from the first to the second vehicle speed.

* * * * *